United States Patent Office 2,715,722
Patented Aug. 16, 1955

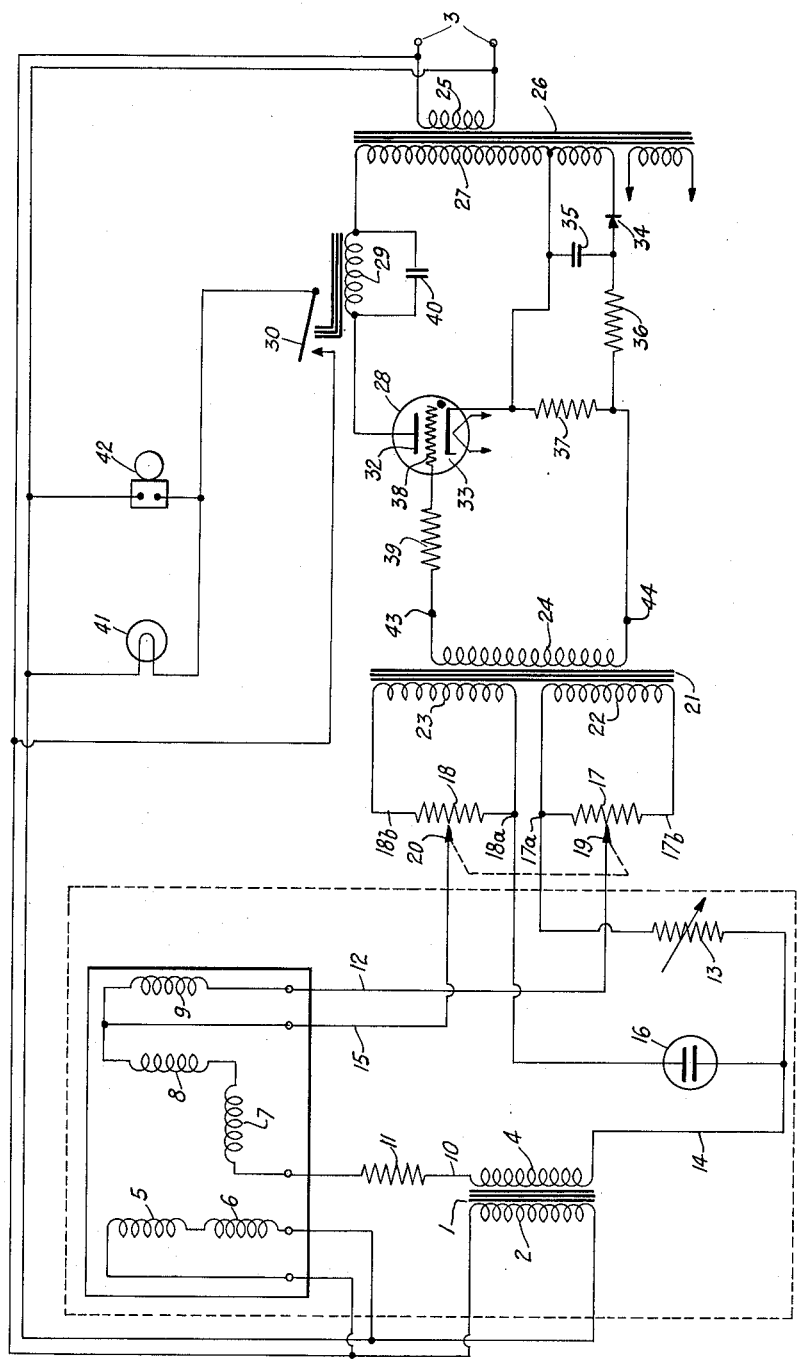

2,715,722

SALINITY INDICATING SYSTEM

Matthew J. Relis, New York, N. Y., assignor to Control Instrument Company, Inc., Brooklyn, N. Y., a corporation of New York Application September 2, 1950, Serial No. 183,067

3 Claims. (Cl. 340—253)

This invention relates to improvements in metering systems and has particular reference to a circuit therefor, to be used for controlling an alarm or other signaling device or a servo mechanism in response to a particular condition which said metering system has under continuous surveillance.

Various methods of securing such alarm and control action have heretofore been proposed, most of which, because of mechanical burdens added to the indicating system or electrical losses introduced therein, suffer the obvious shortcoming of introducing inaccuracies beyond the tolerance to which these systems are required to operate.

In the present system it is proposed that by monitoring the currents used to actuate an indicating device so as to determine variations therein, a control circuit may be obtained when that condition arises which necessitates control action. This suggested procedure has the advantage that the indicating instrument is in no wise burdened and no calibration error is produced.

The inventive idea herein expressed is capable of receiving a variety of expressions, one of which for purposes of illustration is shown in the accompanying drawing, is being expressly understood that said drawing and the specification thereof are utilized only to describe rather than to limit and define the invention as a whole, reference being had to the appended claims for that purpose.

The drawing is a diagrammatic view of a metering system showing a current comparing apparatus in conjunction with a signaling and alarm system or device.

The circuits of the present invention are shown in an adaptation to a salinity indicating system such as illustrated in the U. S. Letters Patent to Ellis, No. 2,306,691, dated December 29, 1942. Said system, briefly described, comprises a line transformer 1 having a primary 2 which is connected to a source of alternating voltage and current 3 and which has a secondary 4. The indicating meter comprises fixed coils 5 and 6 which are connected, as is the transformer primary, to the line and constantly maintained energized thereby. The meter further comprises a moving coil assembly consisting of coils 7, 8 and 9 all of which are connected in series electrically and energized from the secondary winding 4 of transformer 1. Two of said coils are aligned and mechanically oriented at right angles to a third. The field of the two coils which are parallel, that is, coils 8 and 9, are opposed so that normally they cancel each other and the third coil being the only coil having an active field will orient itself in the field of coils 5 and 6 so that the indicating meter is normally positioned to center scale.

The secondary 4 is connected to the coil 7 by way of the lead 10 and the resistor 11. The current from the resistor 11 flows through the coils 7 and 8 and branches from the latter coil, a part thereof flowing through coil 9 by way of the lead 12 and through the circuit consisting of the potentiometer 17 and transformer winding 22, entering said circuit through tap 19 and leaving it through terminal 17a; thence said current flows through resistor 13 and lead 14 back to the transformer winding 4. The remainder of the current from coil 8 passes, by way of lead 15, through the circuit consisting of potentiometer 18 and transformer winding 23 having entered said circuit through tap 20 and leaving said circuit through terminal 18a, flowing from there through the salinity cell 16 and lead 14 and back to transformer winding 4. Thus opposing torques are set up within the coils of the indicating meter depending upon the value of the resistor 13 and on the resistance of the cell 16 or the conductivity of the solution in which it is immersed. All of the foregoing applies to that portion of the drawing included in the dotted rectangle and is described in greater detail in said patent to Ellis, wherein the adjustments of the temperature compensating resistor 13, the values of the resistor 11 and the proportions in which the currents initially divide as well as the behavior of the indicating instrument itself, is more completely discussed.

Since the position of the indicator of the indicating instrument is determined by the relative magnitudes of the currents flowing in the leads 12 and 15, the portions of the monitoring means which comprise the potentiometer type resistors 17 and 18 which are included in those leads will leave that proportion relatively unchanged if said resistors, to begin with, are small as compared to the resistances of the temperature compensating resistor 13 and of the conductivity cell 16, and hence leave the indicating meter position unaffected.

The transformer 21 is provided with two primary windings 22 and 23. Winding 22 is connected across the entire resistance of potentiometer 17 and winding 23 across the entire resistance of potentiometer 18. In the preferred realization shown, both windings have an identical number of turns and the potentiometers have equal resistances.

Thus connected, the current which flows in the compensating resistor 13 flows also in part of the potentiometer 17 and the IR drop across this part of potentiometer 17 causes a current flow in winding 22 of transformer 21. Similarly the flow of current in the conductivity cell 16 also flows in part of the potentiometer 18 and this IR drop causes a current flow in winding 23. These windings are poled, so that the fluxes in the core of transformer 21 generated thereby are opposed. It follows, therefore, that for equal coil currents, the fluxes will cancel and there will be no induced voltage in the secondary.

It further follows that for any arbitrary ratio of compensator current to cell current, a setting may be found for the taps 19 and 20 which will give this null condition. The potentiometers are interconnected so that the resistance of potentiometer 17 between tap 19 and the terminal 17a plus the resistance of potentiometer between tap 20 and terminal 18a is constant and equal to the total resistance of one potentiometer, and are ganged together and simultaneously operated so that this condition is always met. As the sliders are moved, the IR drop in one potentiometer is increased by increasing the resistance between the slider and the active terminal, while the IR drop in the other is decreased so that, regardless of the ratio of cell and compensator currents, a resistance ratio may be found to yield a voltage null from secondary 24.

With the resistance of the salinity cell designated as $R_c$, the resistance of the temperature compensating resistor 13 as $R_t$, the sum total of the resistance of the portion of potentiometer 18 between tap 20 and the terminal 18a plus the resistance of the portion of the potentiometer 17 between terminal 17a and 19 as R, and the resistance between the slider 20 and the terminal 18a of potentiometer 18 as $R_1$, then there will be a null in the second 24 of transformer 21 when, to a good approximation $$\frac{R_1}{R} = \frac{1}{1+\frac{R_c}{R_t}}$$

so that a point may be found for any arbitrary concentration and temperature within the useful range of the instrument by the setting of the taps 19 and 20 so that no output voltage exists in said secondary 24. An increase in the voltage of either primary will thereupon cause an output across said secondary, and if the phase of the output due to one primary is taken as a reference, the output due to the other will be 180° leading or lagging.

An alternating voltage taken from the line 3 is applied to the primary 25 of the transformer 26. A part of the secondary 27 thereof is connected to the thyratron 28 by way of the relay coil 29. This voltage is applied between the plate 32 and the cathode 33 of the thyratron 28 and would render the tube conductive every half cycle whenever the plate thereof is positive with respect to the cathode unless prevented from firing by application of bias to its grid. To prevent this firing the voltage across the remaining portion of the secondary 27 is rectified in the rectifier 34 and filtered in a filter comprising the capacitor 35 and the resistors 36 and 37 whose junction is connected to one terminal of the secondary 24 of the transformer 21. The other terminal of secondary 24 is connected to the grid 38 of the thyratron with the resistor 39 in series to prevent excessive flow of grid current and thereby the destruction of the thyratron. Since the rectifier 34 is so oriented as to permit only the flow of a negative peak of the alternating voltage impressed thereon, a negative bias will be impressed upon the grid by way of the transformer secondary 24 whose magnitude will be determined by the ratio of resistance of the resistors 36 and 37 and should be so proportioned that the thyratron 28 is on the verge of firing in the absence of a voltage from the secondary 24 of transformer 21.

When an alternating voltage is induced in the secondary 24 of the transformer 21 from either the cell current or the temperature compensated current, this voltage will also be impressed upon the grid of the thyratron 28 and this voltage will add to the negative bias on negative peaks and subtract from that bias on the positive peaks.

Since for a given setting of the taps 19 and 20 there is one and only one ratio of salinity cell current and temperature compensator current giving a null output in the secondary 24, if either of these currents changes from the null condition then secondary 24 will impress upon the grid of the thyratron 28 a voltage whose magnitude and phase will be characteristic of that change. If the ratio of the resistances $$\frac{R_c}{R_t}$$

increases then the voltage induced in the secondary 24 will be in phase with the voltage applied by way of secondary 27 to the plate 32 of thyratron 28. In this event, it will subtract from the bias applied to the thyratron when its plate is positive and cause the thyratron to fire. Current will flow in the tube and consequently in the relay coil 29 which current will be continuous despite the fact that the tube fires during only a portion of each cycle due to the condenser 40 across the relay coil. The contacts 30 will thereupon close and energize the signal lamp and the alarms 41 and 42. On the other hand, if the ratio $$\frac{R_c}{R_t}$$

decreases then the voltage induced in the secondary winding 24 will be out of phase with the voltage applied by way of secondary 27 to the plate 32 of thyratron 28. In this event it will add to the negative bias applied to the thyratron when its plate is positive and will prevent the thyratron from firing no matter how small the ratio $$\frac{R_c}{R_t}$$

may become. The instrument thus gives an indication when the concentration decreases beyond the desired null value but gives no indication when the concentration increases beyond the desired null value.

If the polarity of the secondary 24 is taken oppositely, that is to say, terminals 43 and 44 reversed so that 44 rather than 43 is connected to grid 38 as shown above, then a decrease in $R_c$ for making the ratio $$\frac{R_c}{R_t}$$

smaller will cause the voltage of secondary 24 to go through a null to produce a grid voltage in phase with the plate voltage when the concentration of the liquid to which the cell 16 is responsive increases above a desired value.

It follows that two such instruments may be employed together so that a concentration may be held within a desired range, and alarms set so that an increase or a decrease of that concentration beyond fixed limits would be indicated.

What is claimed is:

1. In a measuring apparatus adapted to compare the respective values of a variable alternating input current and another independently variable input current of the same frequency, a transformer having a pair of primary windings and a single secondary winding, a pair of resistors each having its terminals connected to the ends of a respective primary winding, a tap on each of said resistors, and means to apply each of said input currents to a tap and a terminal of a respective resistor to energize said primary windings in phase opposition with respect to their effects upon said secondary winding, the location of the tap on at least one of said resistors being variable so that the relative locations of said taps on their respective resistors are adjustable to produce a null condition in the secondary winding of said transformer when said input currents are in any given ratio, whereby an output voltage occurring in said secondary winding is indicative of a ratio deviation of said input currents from the ratio for which said taps are relatively adjusted and the phase relationship of said output voltage with respect to said input currents in indicative of the direction of said ratio deviation.

2. In a measuring apparatus adapted to compare the respective values of a variable alternating input current and another independently variable input current of the same frequency, a transformer having a pair of primary windings and a single secondary winding, a pair of resistors each having its terminals connected to the ends of a respective primary winding, a tap on each of said resistors, means to apply each of said input currents to a tap and a terminal of a respective resistor to energize said primary windings in phase opposition with respect to their effects upon said secondary winding, the location of the tap on at least one of said resistors being variable so that the relative locations of said taps on their respective resistors are adjustable to produce a null condition in the secondary winding of said transformer when said input currents are in any given ratio, and signal means coupled to said secondary winding and responsive to the phase relationship of the output voltage thereof with respect to said input currents for giving an indication whenever the ratio of said input currents varies in a given direction from the ratio for which said taps are relatively adjusted.

3. In a measuring apparatus adapted to compare the respective values of a variable alternating input current and another independently variable input current of the same frequency, a transformer having a pair of primary windings and a single secondary winding, a pair of resistors each having its terminals connected to the ends of a respective primary winding, a tap on each of said resistors, means to apply each of said input currents to a tap and a terminal of a respective resistor to energize said primary windings in phase opposition with respect to their effects upon said secondary winding, the location of the tap on at least one of said resistors being variable so that the relative locations of said taps on their respective resistors are adjustable to produce a null condition in the secondary winding of said transformer when said input currents are in any given ratio, signal means coupled to said secondary winding and responsive to an output voltage thereof for giving a warning indication when the ratio of said input currents varies from the ratio for which said taps are relatively adjusted, and signal suppression means including said secondary winding responsive to a given phase relationship of said output voltage to said input currents to prevent said signal means from giving said warning indication.

References Cited in the file of this patent

UNITED STATES PATENTS

| Number | Name | Date |
|---|---|---|
| Re. 21,003 | Knerr et al. | Feb. 14, 1939 |
| 2,050,629 | Quereau et al. | Aug. 11, 1936 |
| 2,058,518 | Schuster | Oct. 27, 1936 |
| 2,322,052 | Ogeden et al. | June 15, 1943 |
| 2,377,363 | Noble et al. | June 5, 1945 |
| 2,408,524 | Mestas | Oct. 1, 1946 |
| 2,451,613 | Darby et al. | Oct. 19, 1948 |
| 2,475,023 | Grimes | July 5, 1949 |
| 2,482,078 | Wallace | Sept. 13, 1949 |
| 2,545,547 | Gates | Mar. 20, 1951 |
| 2,592,825 | Rutenberg | Apr. 15, 1952 |